United States Patent [19]

Seevers et al.

[11] Patent Number: 4,694,725
[45] Date of Patent: Sep. 22, 1987

[54] SOUND GENERATING SYSTEM FOR A KEYBOARD

[75] Inventors: Daniel B. Seevers; John J. Rohulich, both of Cambridge, Ohio

[73] Assignee: NCR Corporation, Dayton, Ohio

[21] Appl. No.: 772,224

[22] Filed: Sep. 3, 1985

[51] Int. Cl.⁴ .............................................. G01H 1/46
[52] U.S. Cl. .................................. 84/1.27; 340/365 S; 381/104
[58] Field of Search ....................... 84/1.01, 1.24, 1.26, 84/1.27; 340/365 S; 381/104, 107

[56] References Cited

U.S. PATENT DOCUMENTS

| | | | |
|---|---|---|---|
| 3,541,548 | 11/1981 | Cogar . | |
| 3,721,976 | 3/1973 | Kuijsten | 340/365 S |
| 4,132,487 | 1/1979 | Fisher | 400/479.1 |
| 4,157,539 | 6/1979 | Hunts et al. | 340/365 C |
| 4,274,752 | 6/1981 | Huber et al. | 400/477 |
| 4,348,932 | 9/1982 | Kashio | 84/1.26 |
| 4,414,538 | 11/1983 | Schnizlein | 340/365 S |
| 4,482,888 | 11/1984 | Todaka . | |
| 4,502,038 | 2/1985 | Lowenthal et al. | 340/365 S |

FOREIGN PATENT DOCUMENTS 1582507  1/1981  United Kingdom .

OTHER PUBLICATIONS

Patents Abstracts of Japan, vol. 8, No. 269 (P-319)(1706), 12-8-84; JP 59-136846.
Patents Abstracts of Japan, vol. 9, No. 23 (E-293)(1746), 1-30-85; JP 59-169213.

Primary Examiner—S. J. Witkowski
Assistant Examiner—David S. Warren
Attorney, Agent, or Firm—Wilbert Hawk, Jr.; Albert L. Sessler, Jr.; Richard W. Lavin

[57] ABSTRACT

A method and apparatus for establishing the volume level of a tone generator associated with a keyboard in which the tone generator will output a click tone when each key on the keyboard is actuated. In establishing the volume level of a click tone, the keyboard is put into a volume setting mode by the actuation of two key members of the keyboard. The subsequent actuation of each key member will produce a different volume level of the click tone. The actuating of a key member results in the storing of a count in a storage member. The storage member is then downcounted until it reaches zero. Upon reaching the count of zero, processing means generates a pulse train in which the pulse width is determined by the time it takes for the storage member to count down to zero.

10 Claims, 8 Drawing Figures

| 01 | 02 | 03 | 04 | 05 | 06 | 07 |
|----|----|----|----|----|----|----|
| 08 | 09 | 0A | 0B | 0C | 0D | 0E |
| 0F | 10 | 11 | 12 | 13 | 14 | 15 |
| 16 | 17 | 18 | 19 | 1A | 1B | 1C |
| 1D | 1E | 1F | 20 | 21 | 22 | 23 | 24 |
| 25 | 26 | 27 | 28 | 29 | 2A | 2B | 2C |
| 2D | 2E | 2F | 30 | 31 | 32 | 33 | 34 |
| 35 | 36 | 0 | 38 | 39 | 3A | 3B | 3C |

FIG. 7
FIG. 8
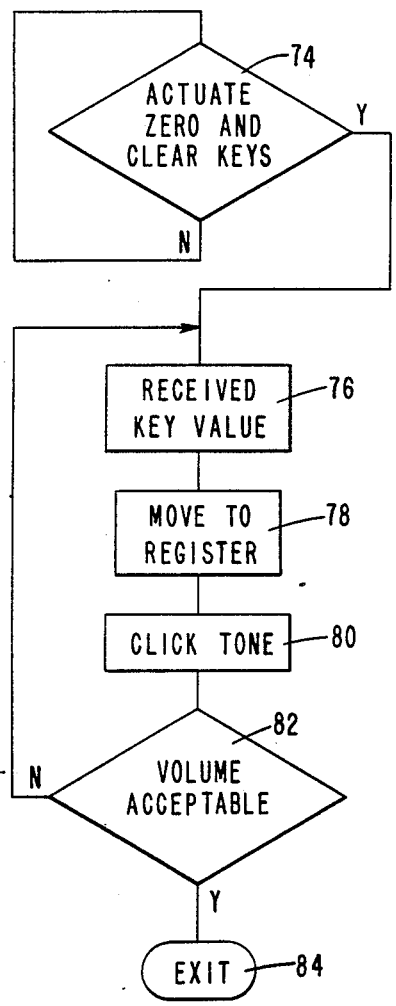
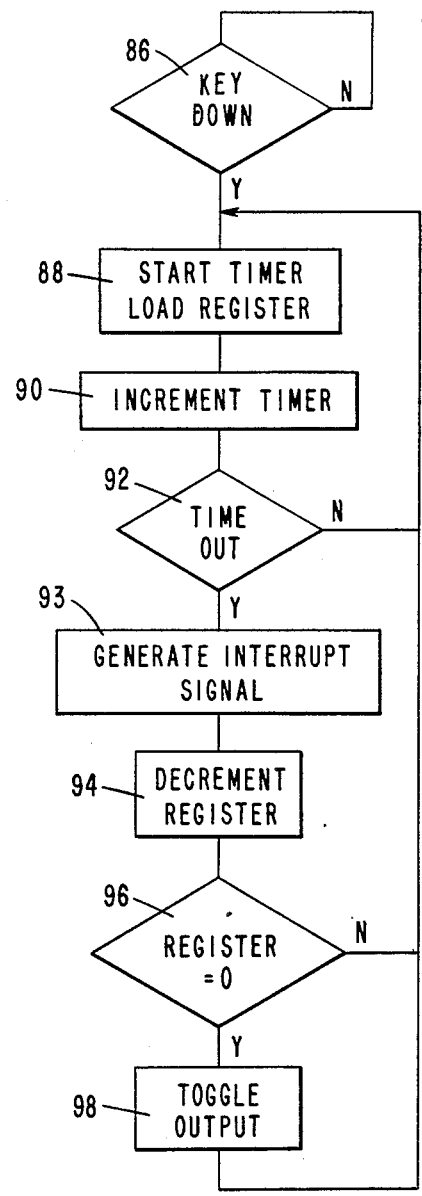

SOUND GENERATING SYSTEM FOR A KEYBOARD

BACKGROUND OF THE INVENTION

The present invention is directed to keyboards associated with a data terminal device and more particularly to a system for generating a tone signal representing the actuation of a key portion of a membrane-type or other types of keyboards that operate without tactile feedback.

With the advent of computers, hand-held calculators and the like, electronic keyboards have been developed in which the keyboard switches take the form of two membrane-type members making contact to provide a signal indicating the key position that has been actuated. The signal thus generated is normally decoded to generate binary data signals representing the actuated key. Prior mechanical type keyboards associated with cash registers or the like were constructed of key switch mechanisms which, when actuated, generated a feedback tone or click indicating the closing of the switch. With membrane type electronic keyboards, such audio feedback is not present. In order to provide such feedback, audio generators have been incorporated into keyboards to provide an audio feedback tone representing the click sound which occurs upon depressing a portion of the keyboard. The loudness control of such audio generators was found in either a switch or a rheostat. The use of this type of volume control was found to be inadequate to provide the required volume levels where the noise environment in which the data terminal was used and the hearing capacity of the terminal operators varies.

It is therefore a principal object of this invention to provide an electronic keyboard associated with a data terminal device having an audio feedback system which can be selectively programmed by the terminal operator to provide a plurality of volume levels to compensate for the noise environment in which the data terminal is used and the hearing capacity of the operator.

It is another object of this invention to control the programming of such an audio feedback system utilizing the key members of the keyboard.

SUMMARY OF THE INVENTION

These and other objects of the invention are fulfilled by providing a circuit associated with an electronic keyboard in which the actuation of each key member affects the volume level of an audio generator. Included in the circuit is a counter which is set at a predetermined count by the actuation of a key member in the keyboard, and when counted to zero controls the pulse-width of a signal which toggles a piezoelectric transducer for operating a loudspeaker to produce a click tone whose volume level is selected in accordance with a key member depressed on the keyboard. Each key member on the keyboard when in a volume setting mode will control the transducer to generate a different volume level of the tone. After the volume level has been selected, the keyboard is put into an operating mode whereby the actuation of any of the key members on the keyboard will produce the same selected volume level of the click tone generated by the loudspeaker.

BRIEF DESCRIPTION OF THE DRAWINGS

Additional advantages and features of the present invention will become apparent and fully understood from a reading of the following description, taken together with the annexed drawings, in which:

FIG. 7 is a flow diagram of the process for putting the keyboard into a volume setting mode;

FIG. 8 is a more detailed flow diagram of the process for changing the volume output of the tone generator.

DESCRIPTION OF THE PREFERRED EMBODIMENT

Figure 1:
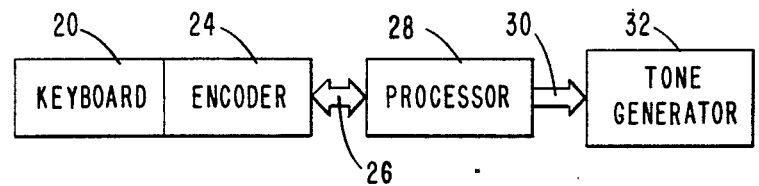
FIG. 1 is a block diagram of the tone generator control system of the present invention.

Referring now to FIG. 1, there is disclosed a block diagram of the system for controlling the volume level of an audio feedback member associated with a membrane type keyboard which produces a click tone similar to that generated by the closing of mechanical switch contacts. Included in the system is a capacitance type keyboard 20 (FIGS. 1 and 2) which changes the capacitance of a portion of a printed circuit board when a key member 22 (FIG. 2) of the keyboard 20 is depressed in a manner that is well-known in the art. Examples of capacitance-type keyboards that may be used in the present embodiment can be found in U.S. Pat. Nos. 4,274,752 and 4,132,487. Operation of the key member 22 in the keyboard results in a keyboard encoder 24 (FIG. 1) outputting a 4 bit binary word over a communication bus 26 to a processor 28. Examples of keyboard encoders that may be used in the present invention can be found in U.S. Pat. Nos. 3,721,976, 4,157,539, 4,502,038 and 4,414,538. As will be described more fully hereinafter, the processor 28 will output a series of control pulses over bus 30 to a tone generator 32 enabling the tone generator to output a click tone signal representing the closing of mechanical switch contacts, the volume of which is controlled by the key member 22 depressed.

Figure 6:
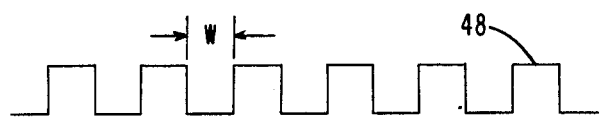
FIG. 6 is a schematic representation of the pulse signal for controlling the output frequency of the tone generator of the present invention.
Figure 4:
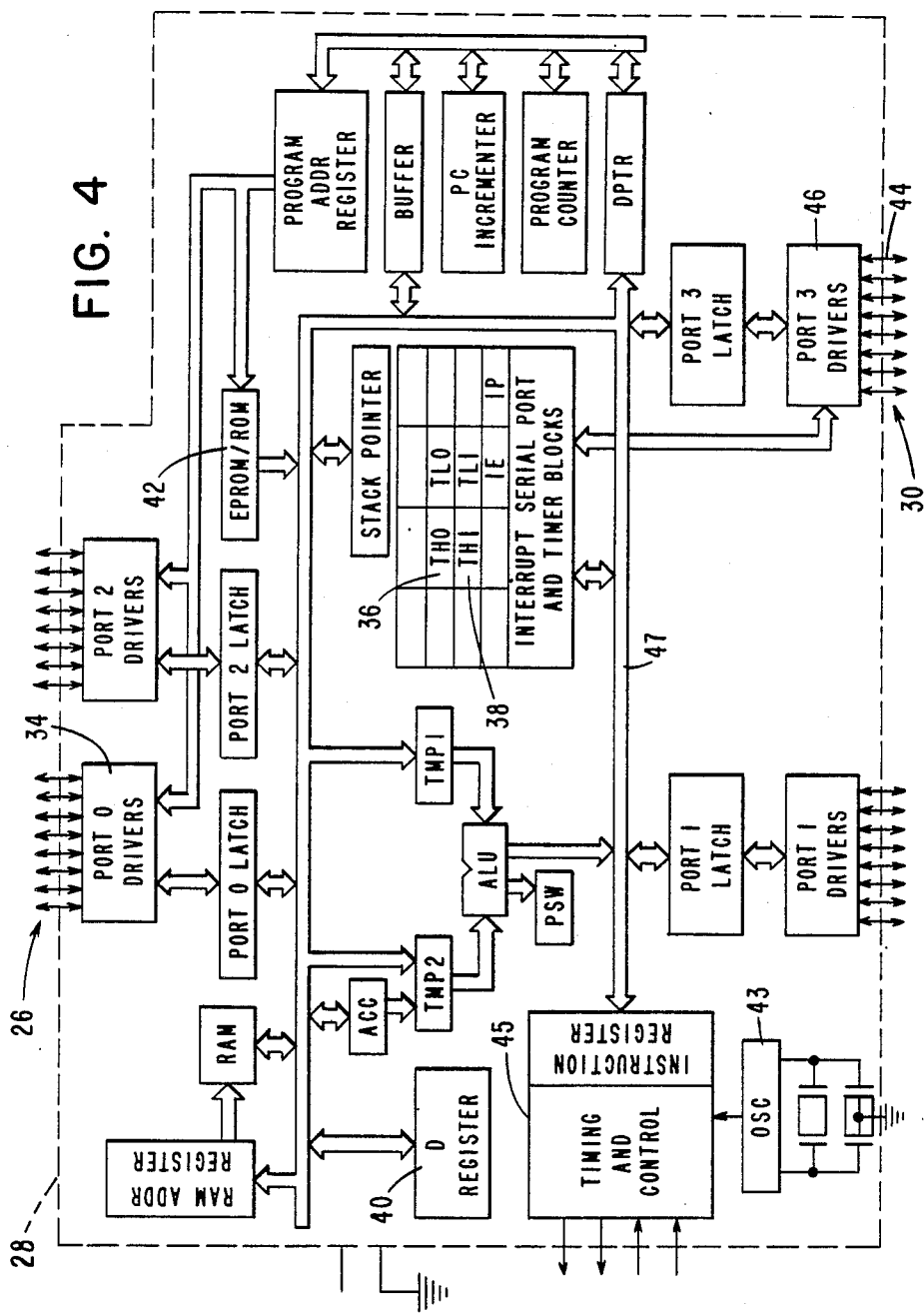
FIG. 4 is a block diagram of the processor associated with the present invention.

Referring now to FIG. 4, there is shown a block diagram of the processor 28 (FIG. 1) which in the present embodiment comprises an Intel 8051 microprocessor and which is commercially available from the Intel Corporation of Santa Clara, Calif. Included in the processor 28 are the port drivers 34 connected to the keyboard encoder 24 (FIG. 1) over the bus 26. Further included in the processor 28 are timers 36 (TH0) and 38 (TH1) together with a storage register 40 and an EPROM/ROM memory unit 42 in which is stored the program for controlling the operation of the processor 28. The processor 28 also includes a 12 MHz oscillator 43 which supplies clock signals to a timing and control circuit 45. The circuit 45 will output over one of the lines 44 of the bus 30 through the port drivers 46 a pulse train 48 (FIG. 6) at a frequency which controls the volume level of the click tone produced by the tone generator 32 in a manner to be described more fully hereinafter.

Figure 5:
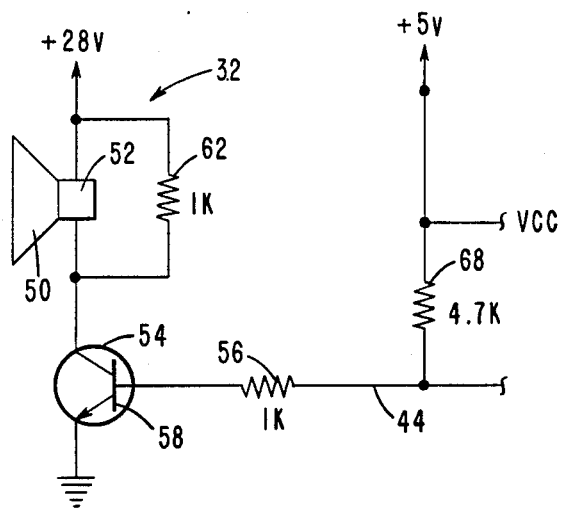
FIG. 5 is a schematic representation of the control circuit associated with the tone generator of the present invention.

Referring now to FIG. 5, there is shown a schematic of the logic circuit for controlling the operation of the tone generator 32 (FIG. 1). The tone generator 32 includes a loudspeaker cone member 50 driven by a piezoelectric drive member 52. The drive member 52 is operated by an NPN transistor 54 whose base terminal 58 is connected over line 44 (FIG. 4) of the bus 30 to the processor 28. The piezoelectric member 52 is operated by the pulse train 48 (FIG. 6) appearing on line 44 and transmitted through a dropping resistor 56 to the base terminal 58 of the transistor 54 cycling the transistor for amplifying the signal which is then transmitted to the piezoelectric member 52 at the frequency of the pulse train 48.

Figures 2, 3:
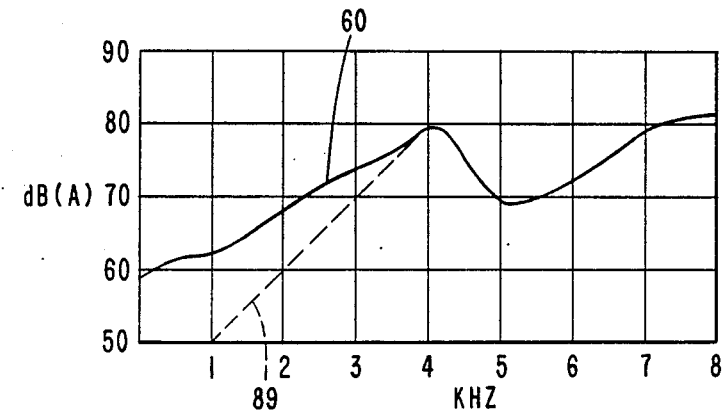
FIG. 2 is a schematic diagram of the keyboard associated with the present invention.
FIG. 3 is a schematic representation of the frequency response curve of the tone generator of the present invention.

As shown in FIG. 3, the piezoelectric member 52 which may comprise a Sonicall SAT 2050 piezoelectric member will output a volume level (dB) in accordance with the frequency (KHz) of the pulse train 48 as illustrated by the curve 60. The piezoelectric element 52 is commercially available from the Bradgor Electronics Co. of Dayton, Ohio. As will be described more fully hereinafter, each of the key members 22 on the keyboard 20 when in a volume setting mode will control a different frequency of the pulse train 48 thus controlling the volume level of the click tone outputted by the loudspeaker member 50. The transistor 54 may comprise a TI 2N2222 which is commercially available from the Texas Instruments Corporation of Dallas, Tex. A 1K resistor 62 is shunted across the piezoelectric member 52 for controlling the shape of the pulse train applied to the piezoelectric element 52. Further included in the circuit is a 5 volt pullup resistor 68.

Referring now to FIG. 7, there is disclosed a flowchart of the events for putting the keyboard 20 into a tone volume setting mode. This sequence is initiated by the depression of the zero key member 70 (FIG. 2) followed by the actuating of the clear key member 72 five times. This actuation of the key member 72 must occur five times (block 74) with key member 70 depressed, at which time the processor 28 will generate a pulse train 48 over the line 44 enabling the loudspeaker member 50 to output a succession of beep tones indicating that the keyboard is in a volume setting mode. The operator will then depress one of the key members 22 on the keyboard 20. The depression of the key member 22 results in the encoder 24 (FIG. 1) outputting a 4 bit binary value (block 76) representing the key member depressed. This binary value is then stored in the register 40 (block 78). The binary value stored in the register 40 is then decremented by 256 microsecond pulse width clock signals outputted by the circuit 45 over bus 47 which register, upon reaching zero, will generate an interrupt signal enabling the circuit 45 to toggle one of the pulses of the pulse train 48 (FIG. 6) appearing on the output line 44 (FIG. 5) of the port driver 46 (FIG. 4), thus establishing the pulsewidth w (FIG. 6) of the pulse train 48. The binary value is again stored in the register 40 and the downcounting operation is again repeated to produce a pulse train 48 whose frequency is dependent on the pulsewidth of the pulses. This action results in the loudspeaker member 50 producing a click tone (block 80) whose volume level is determined by the frequency of the pulse train 48. If the volume level is acceptable to the operator (block 82), the mode sequence is exited (block 84) by the depression of the clear key member 72. If the volume level is unacceptable to the operator because of the noise level in which the keyboard is used, a second key member is depressed. This sequence of operation is again repeated by depressing other key members until an acceptable volume level of the click tone is obtained. Normally, the key members, starting with the upper left-hand corner of the keyboard 20 (FIG. 2) and moving along a horizontal line across the keyboard, will produce succeeding higher volume levels of the click tone. After the clear key member has been activated which terminates this mode of operation, the subsequent depression of any of the key members 22 on the keyboard 20 will output the same binary value to the processor 28 resulting in the selected volume level of the click tone signal being produced by the loudspeaker member 50.

Referring now to FIG. 8, there is shown a more detailed flowchart of the events represented in blocks 76, 78 and 80 of FIG. 7 for selecting the frequency of the pulse train 48 by the actuation of a key member 22 on the keyboard 20. The processor 28 will check (block 86) to see if any of the key members 22 on the keyboard 20 have been actuated. The processor 28, upon receiving the 4 bit binary value identifying the key member that has been depressed, will use the binary value to address a table (not shown) stored in the ROM memory unit 42 (FIG. 4) for outputting a second binary value representing the key member depressed. This second binary value of each of the selected key members 22 of the keyboard 20 has previously been determined by dividing the frequency range location under the dotted line 89 of the curve 60 (FIG. 3) by the number of key members in the keyboard 20 designated to select a volume level of the click tone. The resulting incremental frequency value is then multiplied by a number representing the relative key position and the resulting frequency value is stored in the ROM memory unit 42. The keyboard 20 of the present invention, as shown in FIG. 3, includes 64 key members, 56 of which are used to select a volume level. Thus the frequency range between 1 and 4 KHz. is divided by 56 to arrive at the incremental value of frequency which is used in determining the frequency of the pulse train 48 (FIG. 6) generated as a result of a key member 22 being depressed. This second binary value representing the key member depressed is then stored (block 88) in the register 40 (FIG. 4), and the timer 36 (TH0) (FIG. 4) is then started. The timer 36 will be incremented (block 90) by clock signals outputted by the timing and control unit 45 (FIG. 4). The timer 36 will time-out after 256 microseconds have elapsed. The processor 28 will then check (block 92) to see if this time-out condition has occurred. If a time-out has occurred, the timer 36 will generate an interrupt signal (block 93) to the processor 28 which enables the processor to decrement the binary value (block 94) stored in the register 40 by one. This sequence is repeated until the value of the register 40 is equal to zero. The processor 28 will continuously check the output of the register 40 (block 96) to see if this value is 0. The time required to time-out the register 40 determines the width w (FIG. 3) of the output pulse and thus the frequency of the pulse train 48. When this time-out occurs, the processor 28 will toggle (block 98) the output pulse 48 by complementing the square wave signal appearing on the output line 44 (FIG. 5) at that time. The processor 28 will then again load the register 40 with the second binary value of the actuated key member resulting in the output of a pulse train 48 having a pulsewidth determined by the second binary value stored in the register 40. This operation continues for as long as the selected key member 22 is depressed.

This frequency of the pulse train 48 will operate the piezoelectric member 52 to output a click tone having a predetermined decibel level as determined by the dotted line 89 under the curve 60 (FIG. 3). After the volume level of the click tone has been selected and the clear key member 72 has been depressed, actuation of any of the selected key members 22 on the keyboard 20 will load the selected second binary value into the register 40 and the downcounting of the register is again undertaken in the manner described above which results in the generation of the click tone at the selected volume level.

The following comprises a detailed program listing for the tone selecting sequences shown in FIGS. 7 and 8. The actual machine codes and instructions shown relate to the Intel 8051 microprocessor chip in the embodiment described, however, the technique employed herein may be extended to other processors. Definition of the various machine codes and instructions may be obtained from, for example, the publication entitled "8051 User Manual" which was published by Intel Corporation in 1982.

| LOCA-TION | OBJECT | SOURCE | | |
|---|---|---|---|---|
| | | CLICK: | | |
| 0434 | C0D0 | | PUSH | PSW |
| 0436 | 75D008 | | MOV | PSW,#08 |
| 0439 | B290 | | CPL | HORN |
| 043B | DC06 | | DJNZ | R4,CL__EX |
| 043D | 7C30 | | MOV | R4,#CLICK__CON |
| 043F | C290 | | CLR | HORN |
| 0441 | C28E | | CLR | TR1 |
| | | CL__EX: | | |
| 0443 | D0D0 | | POP | PSW |
| 0445 | 32 | | RET1 | |
| | | $EJECT | | |
| 09E4 | 203508 | | JB | CLR__FLAG,ZK__1 |
| 09E7 | C237 | | CLR | CLIK__FLG |
| 09E9 | 7556Q5 | | MOV | CLIK__CT,#05 |
| 09EC | 020A04 | | JMP | PUT__KEY |
| | | ZK__1: | | |
| 09EF | D55609 | | DJNZ | CLIK__CT,ZK__EXT |
| 09F2 | 0556 | | INC | CLIK__CT |
| 09F4 | D237 | | SETB | CLIK__FLG |
| 09F6 | 740A | | MOV | A,#10 |
| 09F8 | 120312 | | CALL | TONE__ON__GOOD |
| | | ZK__EXT: | | |
| 09FB | 22 | | RET | |
| | | CHG__CLIK: | | |
| 09FC | F4 | | CPL | A |
| 09FD | F58D | | MOV | TH1,A |
| 09FF | F58B | | MOV | TL1,A |
| CA01 | D28E | | SETB | TR1 |
| 0A03 | 22 | | RET | |
| 0A07 | 2037F2 | | JB | CLIK__FLG,CHG__CLIK |

While the form of the invention shown and described herein is admirably adapted to fulfill the objects primarily stated, it is to be understood that it is not intended to confine the invention to the forms or embodiments disclosed herein for it is susceptible of the embodiment in various other forms within the scope of the appended claims.

We claim:

1. In a data terminal device having a keyboard including a plurality of key members for generating data when operated, a system for generating an audio signal in response to the operation of a key member in the keyboard comprising:

means mounted in said keyboard for generating an audio output signal;

means coupled to said signal generating means for outputting a plurality of electrical signals at a first predetermined frequency for operating said signal generating means to output an audio signal at a first decibel level in accordance with the frequency of the electrical signals outputted by said outputting means;

means coupled to said outputting means for varying the frequency of the electrical signals outputted by said outputting means including counting means for counting a predetermined count, said varying means outputting a control signal to said outputting means upon said counting means reaching said predetermined count whereby said outputting means will vary the frequency of the electrical signal in accordance with the time the control signal is generated; and encoding means coupled to said counting means and each of the key members for outputting a different predetermined count to said counting means in response to the operation of each of said key members whereby said varying means will control the frequency of the electrical signals outputted by said outputting means in accordance with the key member operated enabling the signal generating means to output an audio output signal at a decibel level which varies with the operation of each of the key members.

2. The sound generating system of claim 1 in which the encoding means outputs binary data identifying the key member operated, said binary data comprising the count outputted to said counting means, said counting means including a storage register in which is stored the binary data outputted by said encoding means and said varying means further including means for outputting clock signals to said storage register for downcounting the count stored in said storage member.

3. The sound generating system of claim 2 in which said audio output signal generating means includes a loudspeaker having a drive member coupled to said varying means for actuating the loudspeaker wherein said varying means controls the frequency of said electrical signal outputted to said drive member enabling the loudspeaker to output an audio signal at a predetermined decibel level in accordance with the frequency of said electrical signal.

4. In a data terminal device having a keyboard including a plurality of key members for generating data when operated, a system for generating an audio signal in response to the operation of a key member on the keyboard comprising;
    transducer means located in said keyboard for generating audio output signals when operated, in which the output signals are established at a first decibel level in response to the receipt of pulse signals at a first predetermined frequency;
    pulse generating means outputting a plurality of pulse signals at a first predetermined frequency;
    means coupled to said pulse generating means for varying the frequency of the pulse signals outputted by the pulse generating means including a storage member for storing a predetermined count;
    processing means coupled to said transducer means and receiving said pulse signals for outputting the pulse signals to said transducer means;
    clock generating means for outputting clock signals to the storage member for downcounting the count stored in the storage member to zero whereby said storage member will output a control signal to said processing means enabling said processing means to output a pulse signal in response to receiving said control signal;
    and encoding means coupled to each of the key members in the keyboard and said storage member for outputting a different predetermined count to said storage member in response to the operation of each of said key members whereby said processing means will output said pulse signals at a predetermined frequency in accordance with the count stored in said storage member enabling said transducer means to generate an audio output signal having a decibel level in accordance with the key member operated.

5. The sound generating system of claim 4 in which the encoding means outputs a plurality of binary signals identifying the operated key member of the keyboard, said binary signals comprising the count to be stored in the storage member, said system further including timing means coupled to said processing means, said storage member and said clock generating means for receiving said clock signals whereby, after receiving a predetermined number of clock signals, said timing means generates an interrupt signal to said processing means enabling said processing means to downcount the count stored in said storage member to zero.

6. A method for controlling the volume level of the audio output of a transducer located within a keyboard of a data terminal device having a plurality of key members mounted therein for actuation to generate data as part of a data processing operation comprising the steps of;
    actuating a key member on the keyboard;
    generating binary data signals identifying the actuated key member in response to the actuation of the key member;
    storing the binary data signals as a count in a storage member;
    downcounting the stored count to zero;
    generating a plurality of electrical signals at a predetermined frequency based upon the time required for downcounting the stored count to zero for operating the transducer to output an audio signal at a decibel level which varies with the count stored in the storage member;
    and varying the frequency of the electrical signals by adjusting the timing of the electrical signals generated each time the storage member is downcounted to zero thereby enabling the transducer to output an audio signal at a decibel level in accordance with the key member actuated.

7. The method of claim 6 which further includes the steps of;
    actuating a second key member on the keyboard enabling the transducer to output an audio signal at a second predetermined decibel level;
    and repeating the key actuating steps until the decibel level of an audio signal produced by the transducer is at an acceptable level.

8. The method of claim 7 which further includes the steps of;
    generating a control signal upon the storage member being downcounted to zero;
    and varying the frequency of the electrical signals in accordance with the time the control signal is generated.

9. The method of claim 8 which further includes the steps of;
    starting the operation of a timer member upon the storing of the binary data signals in the storage member;
    and downcounting the storage member each time the timer member reaches a predetermined count.

10. The method of claim 9 which further includes the step of actuating a control key on the keyboard enabling each key member on the keyboard to output an audio signal having the same decibel level.

* * * * *